United States Patent [19]

Mazumder et al.

[11] Patent Number: 4,641,018
[45] Date of Patent: Feb. 3, 1987

[54] BAR CODE AND READING AND DECODING DEVICE

[75] Inventors: Ali T. Mazumder; Mohamed S. Kamel, both of Waterloo, Canada

[73] Assignee: NCR Corporation, Dayton, Ohio

[21] Appl. No.: 670,424

[22] Filed: Nov. 9, 1984

[51] Int. Cl.$^4$ ............................................ G06K 7/10
[52] U.S. Cl. ................................... 235/462; 235/494
[58] Field of Search ............................... 235/462, 494

[56] References Cited

U.S. PATENT DOCUMENTS

| | | | |
|---|---|---|---|
| 3,225,175 | 12/1965 | Hyypolainen | 235/61.7 |
| 3,562,494 | 2/1971 | Schmidt | 235/61.11 |
| 3,604,899 | 9/1971 | Donohoe | 235/61.11 |
| 3,654,435 | 4/1972 | Vaccaro | 235/61.12 |
| 3,663,802 | 5/1972 | Wildhaber | 235/61.12 |
| 3,671,722 | 6/1972 | Christie | 235/61.12 |
| 3,676,644 | 7/1972 | Vaccaro et al. | 235/61.11 |
| 3,766,364 | 10/1973 | Krecioch et al. | 235/61.11 |
| 3,796,862 | 3/1974 | Asija | 235/61.11 |
| 4,035,623 | 7/1977 | Eastell et al. | 235/61.11 |
| 4,146,175 | 3/1979 | Daboub et al. | 235/462 |
| 4,259,569 | 3/1981 | Passer et al. | 235/463 |
| 4,283,622 | 8/1981 | Passer et al. | 235/462 |
| 4,408,121 | 10/1983 | Galatha | 235/494 |
| 4,450,349 | 5/1984 | Apitz et al. | 235/462 |

*Primary Examiner*—Harold I. Pitts
*Attorney, Agent, or Firm*—Wilbert Hawk, Jr.; Albert L. Sessler, Jr.

[57] ABSTRACT

A trinary bar code and a device for reading and decoding said bar code are described. A predetermined number of bar code elements on a substrate makes up each character of data. Each bar code element is selected from a group comprising a first element in the form of a bar having a first length, a different sensibility than the substrate, and a given width; a second element in the form of a bar having a different length than said first element, a different sensibility than said substrate, and a width substantially the same as said given width; and a third element in the form of a space having a width substantially the same as said given width and having the sensible characteristic of said background. The device for reading and decoding the bar code includes a plurality of sensors, a corresponding plurality of flip flops to which the sensors are coupled, gates connected to the flip flops to provide combinations of signals from the flip flops, a group of latches coupled to the gates and equal in number to the number of bar code elements per character, a control circuit to cause the latches sequentially to store data corresponding to the sequential sensing of the bar code elements; and a decoding circuit coupled to the latches to decode the latched data to output the encoded character.

28 Claims, 10 Drawing Figures

FIG. 1

| DEC EQU | BINARY | BAR-PARTIAL BAR CODE |
|---|---|---|
| 0  | 0 0 0 0 | 0 0 0 0 |
| 1  | 0 0 0 1 | 0 0 0 1 |
| 2  | 0 0 1 0 | 0 0 1 0 |
| 3  | 0 0 1 1 | 0 0 1 1 |
| 4  | 0 1 0 0 | 0 1 0 0 |
| 5  | 0 1 0 1 | 0 1 0 1 |
| 6  | 0 1 1 0 | 0 1 1 0 |
| 7  | 0 1 1 1 | 0 1 1 1 |
| 8  | 1 0 0 0 | 1 0 0 0 |
| 9  | 1 0 0 1 | 1 0 0 1 |
| 10 | 1 0 1 0 | 1 0 1 0 |
| 11 | 1 0 1 1 | 1 0 1 1 |
| 12 | 1 1 0 0 | 1 1 0 0 |
| 13 | 1 1 0 1 | 1 1 0 1 |
| 14 | 1 1 1 0 | 1 1 1 0 |
| 15 | 1 1 1 1 | 1 1 1 1 |
| 16 |  | 0 0 0 X |
| 17 |  | 0 0 X 0 |
| 18 |  | 0 0 X X |
| 19 |  | 0 X 0 0 |
| •  |  | • |
| •  |  | • |
| •  |  | • |
| 30 |  | X X X X |
| 31 |  | X X X 1 |
| •  |  | • |
| •  |  | • |
| 77 |  | X 0 0 1 |
| 78 |  | X X 1 1 |
| 79 |  | X 1 X 1 |
| 80 |  | X 1 1 1 |

— REPRESENTATION —

A BAR = 1
NO BAR = 0
PARTIAL BAR = X

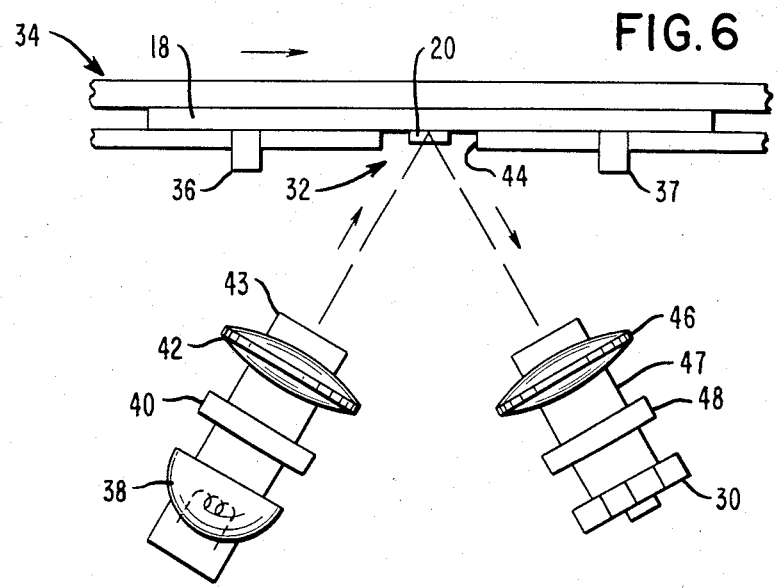
FIG. 6
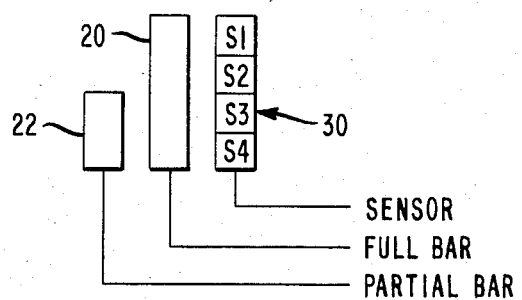
FIG. 4
FIG. 5

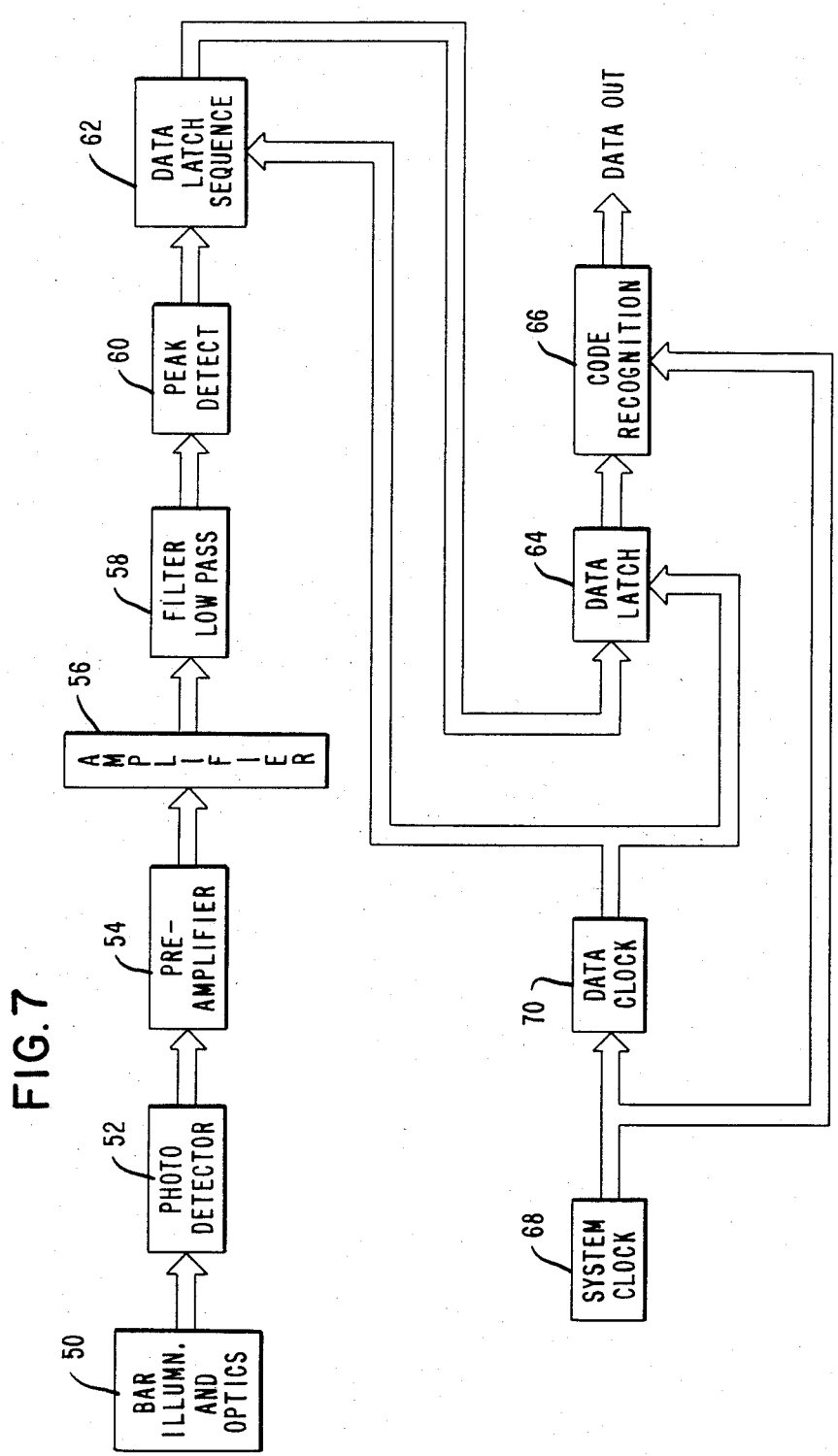

BAR CODE AND READING AND DECODING DEVICE

BACKGROUND OF THE INVENTION

A machine-readable code, such as a bar code, may be usefully employed in the automated high-speed processing of documents, such as, for example, the processing of checks in banks and other financial institutions. Bar codes are particularly well suited for use in connection with the processing of checks and similar documents, since they are easily printed, easily read by machine "on the fly," as the document is being transported, and can store a substantial amount of information in a relatively small space. Various types of bar codes are currently known, such as binary codes based upon the printing (=1) or nonprinting (=0) of a bar, the use of bars of different lengths and widths, and the use of bars of different colors. Since sorting and other mechanical document handling operations can be facilitated and enhanced by including various categories of information in that which is encoded and placed on the document, and since the amount of space for such coded information on the document is limited, the development of codes which increase the density of information storage can contribute substantially to increased efficiency in the automated processing of documents.

SUMMARY OF THE INVENTION

The present invention relates to a unique bar code, and apparatus for sensing and decoding such a code. More particularly, the unique code of the present invention is based upon the presence of a full bar, the presence of less than a full bar, and the absence of a bar, in predetermined combinations for the representation of information to be encoded.

In accordance with one embodiment of the invention, a record medium has a background of a given sensible characteristic and has sensible indicia located thereon in a plurality of zones of substantially equal area; each zone representing a pre-determined value and comprising a plurality of elements, each selected from a group comprising a first element in the form of a bar having a first length, a different sensibility than said background and a given width; a second element in the form of a bar having a different length than said first element, a different sensibility than said background and having a width substantially the same as said given width; and a third element in the form of a space having a width substantially the same as said given width and having the sensible characteristic of said background.

In accordance with a second embodiment of the invention, a bar code, which can be sensed and decoded by a sensing and decoding device, comprises a plurality of code zones of substantially equal area on a substrate; each zone representing a predetermined value and comprising a plurality of elements each selected from a group comprising a first element in the form of a bar having a first length, a first sensibility and a given width; a second element in the form of a bar having a different length than said first element, having said first sensibility and having a width substantially the same as said given width; and a third element in the form of a space having a width substantially the same as said given width and having a sensible characteristic different from said first sensibility.

In accordance with a third embodiment of the invention, a device for reading and decoding bar code, said bar code comprising three different types of bar code elements, comprises, in combination, a plurality of sensing means for sequentially sensing each bar code element in a data-representing group; logic circuit means coupled to said sensing means and including first and second gating means for producing a combined signal representing one of said three different types of bar code elements in response to sequential sensing of each code element by said plurality of sensing means; a plurality of storage means, each one coupled to said first and second gating means for storage of said combined signals, and each having a plurality of outputs on which storage output signals representing said combined signals are produced; sequential means for causing successive ones of said storage means sequentially to store combined signals representing sequentially sensed bar code elements; and decoding means coupled to said outputs of said plurality of storage means for producing decoded data from successive groups of storage output signals from said plurality of storage means.

An object of the invention is to provide a novel and effective code and an apparatus for sensing and decoding said code.

A further object is to provide a bar code of high density for the efficient encoding of information.

A further object is to provide a trinary bar code.

A further object is to provide a bar code which is based upon the presence of a full bar, the presence of less than a full bar, and the absence of a bar in pre-determined combinations for the representation of information to be encoded.

With these and other objects, which will become apparent from the following description, in view, the invention includes certain novel features of construction and combinations of parts, one form or embodiment of which is hereinafter described with reference to the drawings which accompany and form a part of this specification.

BRIEF DESCRIPTION OF THE DRAWINGS

FIG. 1 shows one group of possible code combinations of the code of the present invention with respect to corresponding decimal and binary equivalents.

FIG. 4 is a diagrammatic representation of a sensor for sensing the bar code, arranged in aligned relationship with representations of a full bar and a partial bar of the code.

FIG. 5 is a table showing the binary values which are sensed by the code when sensing a full bar, a partial bar, and no bar.

FIG. 6 is a diagrammatic representation of a document in a document transport path, the apparatus for applying illumination to a selected portion of the document, and the apparatus for sensing the encoded portion of said document as it is transported.

FIG. 7 is a flow diagram showing the process by which the code is sensed and decoded.

DESCRIPTION OF THE PREFERRED EMBODIMENT

Figure 2:
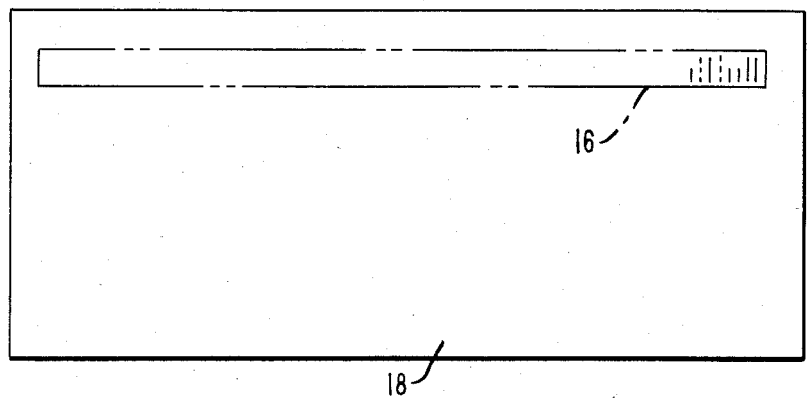
FIG. 2 shows one embodiment of the code of the present invention on a document.

In the most common form of bar code, the presence of a bar represents bit 1 and the absence of a bar represents bit 0. Using this technique, the number of different characters which can be represented is $2^{n-1}$ where "n" represents the number of elements, such as bars, per character. Thus, if 3 bits or bars per character are provided, the maximum number of different characters possible is 8 (including 0), as shown under the heading "BINARY" in FIG. 1. Similarly, using a 4-element binary code, a maximum of 16 different characters (including 0) could be provided.

The code of the present invention operates to a base 3, rather than to a base 2, using a full bar, a partial bar, and the absence of a bar to represent the three possible conditions, in the illustrated embodiment. Using this technique, the number of different characters which can be represented is $3^{n-1}$ where "n" represents the number of elements, such as bars, per character. The maximum number of characters which can be represented using three elements is 27 (including 0). Similarly, using a 4-element trinary code, a maximum of 81 different characters (including 0) could be provided, as partially shown in FIG. 1 under the heading "BAR-PARTIAL BAR CODE".

Figure 3:
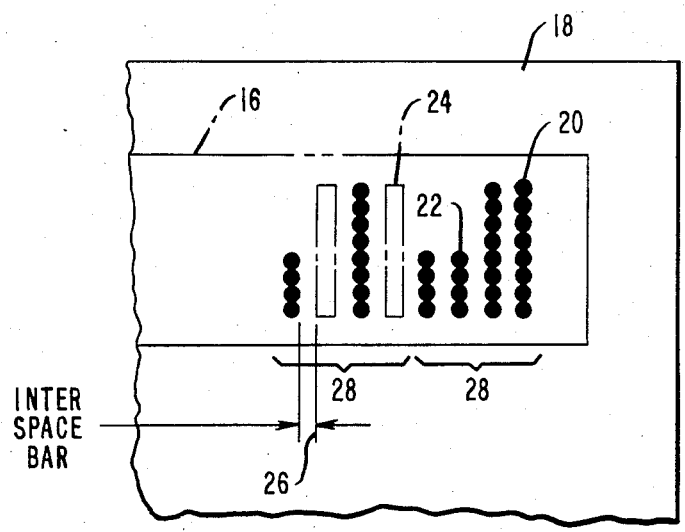
FIG. 3 shows an enlarged representation of a portion of FIG. 2.

FIGS. 2 and 3 illustrate typical full bar and partial bar configurations encoded in a defined area 16 on a document 18. For convenience throughout the remainder of the specification, the partial bar will be referred to as a half bar, in order to be compatible with the particular sensing and decoding arrangement shown and described herein. However, it will be apparent to one skilled in the art that any partial bar, which differs sufficiently in its height dimension from the full bar to be readily distinguishable by the sensing means, could be employed in place of the half bar.

As best shown in FIG. 3, the code may be comprised of a full bar 20, a half bar 22 and an absent bar 24. The bars can be printed by any suitable printing means, including a relatively low-cost means such as a dot matrix printer, which produces a relatively low-quality print, as shown by the bars in FIG. 3, but one that can be readily detected by the sensing means. If desired, the bar code can be printed using an ink or ribbon having special characteristics which enhance the ease of detection, such as a magnetic or fluorescent ink or ribbon.

It will be seen that the bars 20 and 22 are regularly spaced apart by a standard interval 26, so that when a bar is absent, as at 24, it will be readily detected. As also shown in FIG. 3, and as indicated by the bracket 28, each character encoded on the document is represented in the illustrated embodiment by four bars or bar spaces or any combination thereof.

On a typical check, the information contained on the front or back in bar code form could include the following: the date, given in day-of-the-year form, such as "106", for example; a 6-digit identification of the machine doing the printing; a 3-digit number indicating whether the check is written "on us" or on some other bank; a 2-digit number indicating whether the check is of domestic or foreign origin; a plurality of error correction digits; a block of digits indicating the start of the line of code; and a block of digits indicating the end of the line of code. Other information, such as the dollar amount of the check, known as the "courtesy amount", might also be included if there were room on the check. The use of a compact code, requiring less space than conventional codes, is thus most advantageous.

FIG. 4 shows diagrammatically the relationship between a full bar 20, a half bar 22 and a sensing device 30. The device 30 comprises four separate sensors or light cells S1, S2, S3 and S4. These light cells may be of the PIN diode type, which include a positive layer, a negative layer, and an intrinsic layer positioned therebetween.

As indicated diagrammatically, in FIG. 4, and as shown in tabular form in FIG. 5, the sensing device 30 is so positioned with respect to the line of bar code elements that when a full bar 20 passes the sensing device 30, all of the cells S1, S2, S3 and S4 will respond to the change in reflected light; when a half bar 22 passes the sensing device 30, the cells S3 and S4 will respond to the change in reflected light; and when neither a half bar nor a full bar passes the sensing device 30 within the predetermined interval, there is no response by any of the cells S1-S4, inclusive.

FIG. 6 diagrammatically shows the manner in which the sensing of the bar code is effected as a document 18 is transported past a sensing station 32 in a track 34. The track 34 may also include position sensors 36 and 37 to detect the presence of a document upstream and downstream from the station 32.

Included in the station 32 are a light source 38, a filter 40 and a lens 42 for providing illumination of the desired wave length through an aperture 44 in the track 34 to illuminate a bar code element such as element 20, exaggerated in size for ready visibility in FIG. 6. The source 38, the filter 40 and the lens 42 will typically be mounted in a suitable mounting means 43 disposed at a suitable angle, such as an angle of 60°, from the path of travel of the document 18. The reflected light then passes through a lens 46 and a filter 48 and impinges upon the four-element sensing device 30. The lens 46, the filter 48 and the sensing device 30 are typically also mounted in a suitable mounting means 47 at an angle of 60° from the path of travel of the document 18. If, for example, the bar 20 has been printed with a suitable fluorescent ink, the light source 38 and the filter 40 will be selected to cause light having a wave length of 330–370 nanometers to impinge on said bar and to excite the ink therein to cause emission therefrom. The filter 48 then permits light having a wave length of up to 470 nanometers to pass therethrough and to fall upon the sensing device 30.

The process and system for decoding the bar code information sensed from the record medium 18 will now be described. Reference may be had to the flow diagram of FIG. 7, which summarizes the entire process, commencing with block 50 wherein the bar code on the record medium 18 is illuminated, and bar block 52, wherein sensing of the illuminated bar code takes place. The resulting electrical signal is pre-amplified as in block 54, amplified as in block 56, filtered as in block 58, and the signal peaks therein are detected as in block 60. The signals are then latched as in block 62, combined and further latched as in block 64, and decoded as in block 66, in order to give the desired information content. System and data clocks for the various operations are provided as indicated by blocks 68 and 70.

The various circuits for accomplishing the operational sequence summarized in FIG. 7 will now be described.

Figure 8:
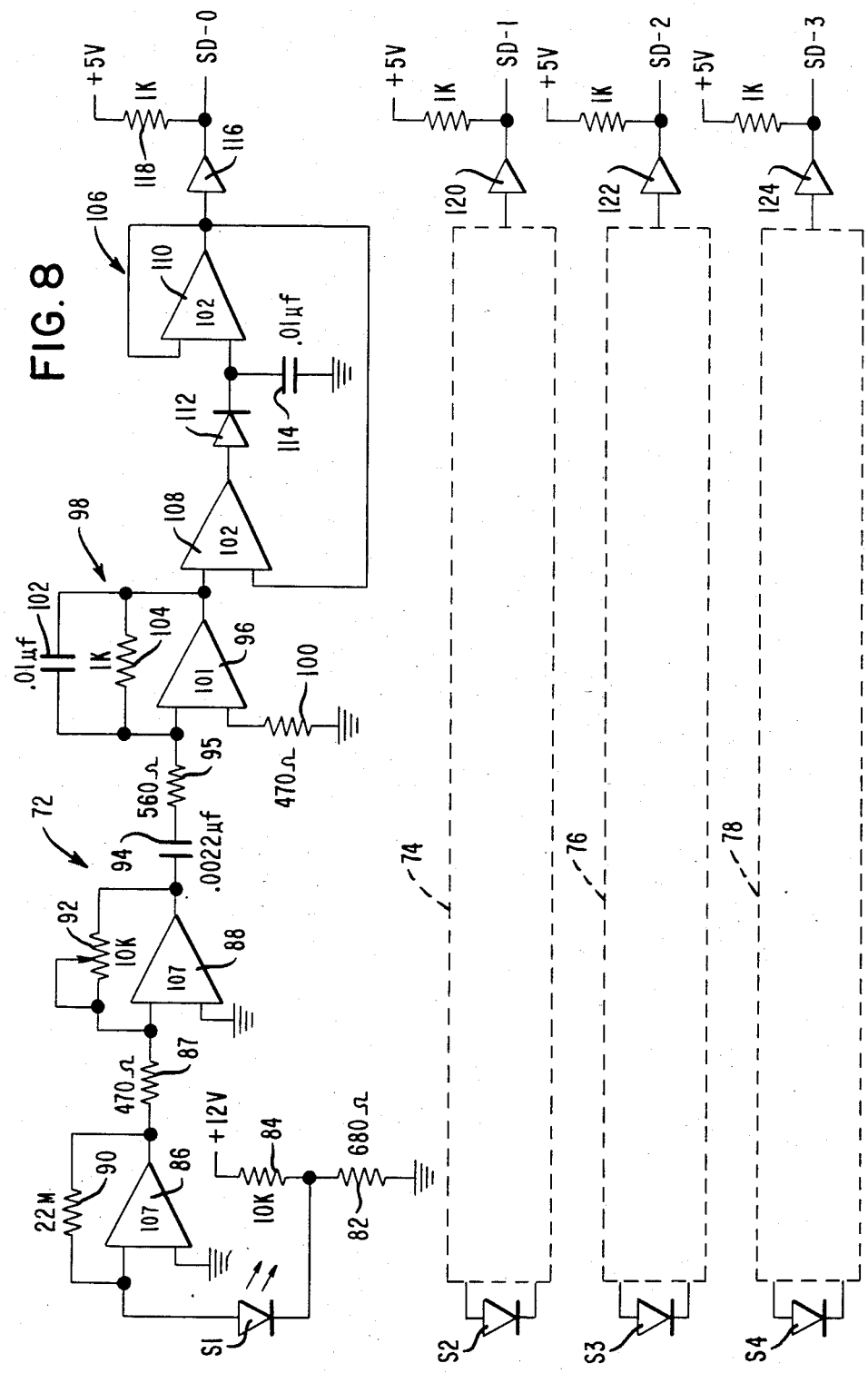
FIG. 8 is a diagram showing in detail the circuitry of one of the sensing channels, together with block representations of the other channels.

Referring to FIG. 8, the light cell S1 is shown in a sensing circuit generally designated by reference character 72. The remaining light cells S2, S3 and S4 are shown in FIG. 8 with associated circuits 74, 76 and 78, respectively, in block form. Since all of these circuits are identical, only the circuit 72 is shown in detail.

One side of the sensor S1 is connected to a biasing circuit which provides a pre-determined threshold for the sensor as a means of eliminating noise. The sensor S1 is connected to the junction of a 680-ohm resistor 82 and a 10,000-ohm resistor 84. The other side of the resistor 82 is connected to a base reference potential, shown as ground. The other side of the resistor 84 is connected to a +12-volt source of potential.

The other side of the sensor S1 is connected to the negative input of an amplifier 86 which performs a pre-amplifying function. The plus input of the amplifier 86 is connected to a base reference potential, shown as ground. The output of the amplifier 86 is connected through a 470-ohm resistor 82 to the negative input of a second amplifier stage comprising an amplifier 88 and also is connected back through a 22-megohm resistor 90 to the negative input of the amplifier 86. The positive input of the amplifier 88 is connected to a base reference potential, shown as ground. The output of the amplifier 88 is connected back through a variable 10,000-ohm potentiometer 92, for adjusting gain, to the negative input of said amplifier.

The output of the amplifier 88 is AC coupled through a 0.0022-microfarad capacitor 94 and a 560-ohm resistor 95 to the negative input of an operational amplifier 96 which forms part of a filtering circuit shown generally as 98. The positive input of said amplifier 96 is connected through a 470-ohm resistor 100 to a base reference potential shown as ground. The output of the amplifier 96 is connected back to its negative input through a parallel combination of a 0.01-microfarad capacitor 102 and a 1,000-ohm resistor 104. The filtering circuit 98 is designed to permit signals of 30 kilohertz or less to pass therethrough, and to block signals of higher frequency. The chosen frequency was determined by considering the normal velocity of the document being processed and the spacing of the bars with the code. If the check speed or bar spacing are slightly different from what is contemplated in the design, signals are still permitted to pass through the filtering circuit 98, because these signals will still in all probability fall below 30 kilohertz, while a frequency above this level is probably indicative of noise or some other spurious signal. Obviously the filter circuit 98 could be altered if necessary to provide for a different range of check speeds.

The circuit indicated generally at 106 is a conventional peak detector circuit for determining the peaks representing bar detection in the signal applied to it. The circuit 106 includes a first amplifier 108, to the positive input of which the output from the amplifier 96 is connected. The negative input of the amplifier 108 is connected to the output of a second amplifier 110, which is also connected back to its own negative input. The output of the amplifier 108 is connected through a diode 112 to the positive input of the amplifier 110, which input is also connected through a 0.01-microfarad capacitor 114 to a base reference potential, shown as ground. The output of the amplifier 110, which is also the output of the peak detector circuit 106, is connected to an open collector inverter 116, the output of which is connected through a 1,000-ohm resistor 118 to a +5-volt source of potential, and which comprises the output SD-0, derived from the cell S1. In like manner, outputs SD-1, SD-2 and SD-3 are derived through circuits 74, 76 and 78 and inverters 120, 122 and 124 from cells S2, S3 and S4, respectively.

Figure 9:
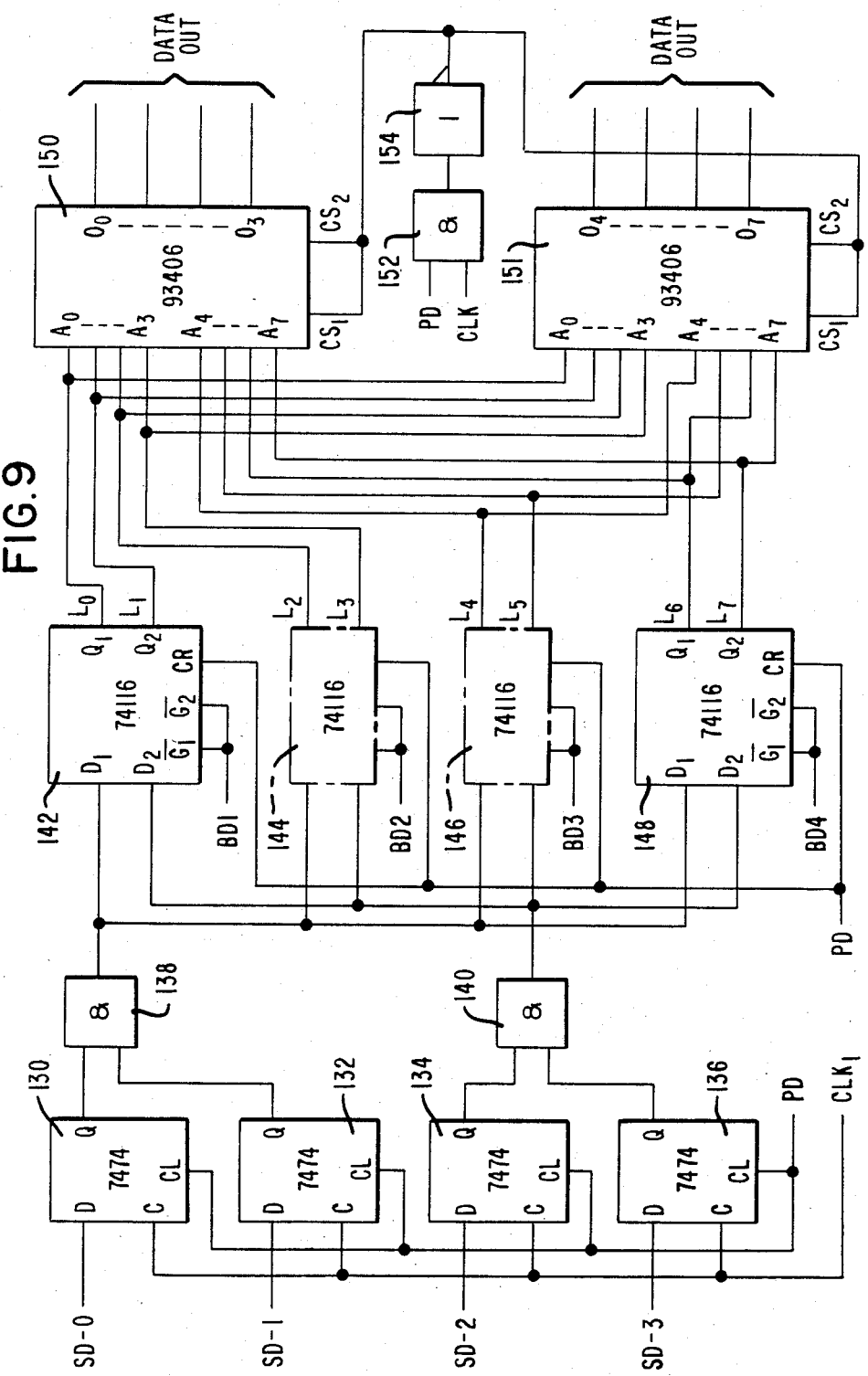
FIG. 9 is a diagram showing the logic circuitry which enables the sensed code information to be stored and decoded.

The outputs SD-0, SD-1, SD-2 and SD-3 of FIG. 8 are shown as inputs at the left side of FIG. 9, which depicts the storage and decoding circuitry of the illustrated embodiment of the present invention. These inputs are applied to four "D"-type flip-flops 130, 132, 134 and 136, which may be of type 7474, manufactured by Texas Instruments, Inc., Dallas, Tex. Each of these flip-flops also has a clock signal CLK1 and a reset signal PD applied thereto. The clock CLK1 is an internal system clock. The signal PD is derived from the sensor 36 (FIG. 6) which senses the leading edge of a document 18 as it approaches the read station 32. As the leading edge of the document passes the sensor 36, the line PD goes "high". The resetting of the flip-flops 130, 132, 134 and 136 by the line PD allows them to be set by data signals SD-0 to SD-3 inclusive. As the trailing edge of the document 18 passes the second sensor 37, the line PD goes low, and prevents the flip-flops 130, 132, 134 and 136 from changing state.

The outputs of flip-flops 130 and 132 are applied to the inputs of an AND gate 138, and the outputs of flip-flops 134 and 136 are applied to the inputs of an AND gate 140. This has the effect of providing a single output representing the condition of the two flip-flops 130 and 132 and of providing a single output representing the condition of the two flip-flops 134 and 136. Referring to the table of FIG. 5, it will be seen that with both of the AND gate outputs positive, a full bar has been sensed, with the output of AND gate 138 negative and the output of AND gate 140 positive, a half bar has been sensed; and with the outputs of both AND gates negative, no bar has been sensed. The combined conditions of the two AND gates are thus capable of representing any of the three code elements; full bar, half bar, or no bar. The AND gate outputs are applied in parallel to the two inputs of each of four latches 142, 144, 146 and 148, which may be of type 74116, manufactured by Texas Instruments, Inc., Dallas, Tex.

The signal PD is applied to each of said latches. In addition, each of the latches 142, 144, 146 and 148, respectively, has its own associated clock signal BD1, BD2, BD3 and BD4, respectively, generated by the circuit of FIG. 10, as will subsequently be described in greater detail. These clock signals are energized sequentially, so that at a given time, only one of the latches 142, 144, 146 and 148 will be set in acordance with the signals applied to its inputs. The timing of the signals BD1-BD4 corresponds to the sequential sensing of four different code elements which make up a character in the illustrated embodiment. Thus, at the end of a sequence of signals BD1-BD4, the latches 142-148 are set so that their outputs represent the four code elements sensed for a given character.

The four sets of outputs L0 to L7 from the latches 142-148 are applied in parallel to inputs A0-A7 of two programmable decoders 150 and 151, which may be of type 93406, manufactured by Fairchild Semiconductor, Mountainview, Calif. The decoders 150 and 151 are also controlled by a signal applied thereto, which is derived by the application of CLK and PD signals to an AND gate 152, the output of which is inverted by an inverter 154 and applied to the decoders 150 and 151.

The output of the decoder 150 is represented by the binary condition of the four outputs $0_0$ to $0_3$, and the output of the decoder 151 is represented by the binary condition of the four inputs $0_4$ to $0_7$. It will be recognized that these eight outputs, taken together, will provide a total of 256 different characters. The two decoders 150 and 151 are internally programmed, in a well-known manner, with the decoder 150 being programmed differently than the decoder 151, to provide the desired output signals in response to different combinations of output signals $L_0$ to $L_7$ from the latches 142, 144, 146, 148 which are applied to inputs $A_0$ to $A_7$ of each of the decoders 150 and 151. For example, with signals of 0,0,1,1,0,0,0,0 applied to inputs $A_0$ to $A_7$ respectively of both decoders 150 and 151, the decoder 150 can be programmed to provide output signals 0,1,0,0 respectively on outputs $0_0$, $0_1$, $0_2$ and $0_3$, while decoder 151 may be programmed to provide "zero" signals on all of the outputs $0_4$, $0_5$, $0_6$ and $0_7$. The resulting decoded eight-bit character, with output $0_0$ representing the least significant character, is 00000010.

Figure 10:
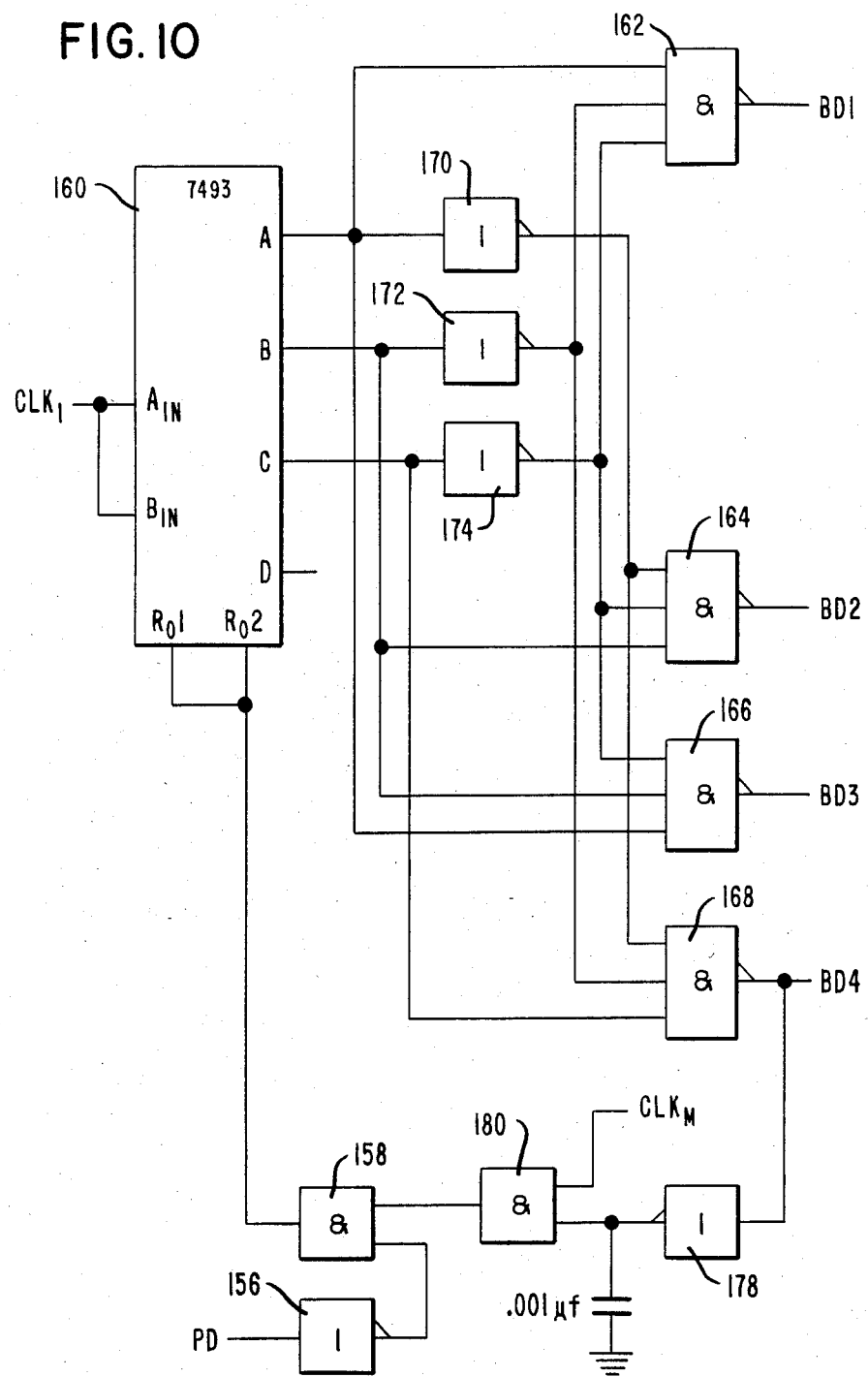
FIG. 10 is a diagram showing the logic circuitry which is employed to obtain timing signals for operation of the circuit of FIG. 9.

The circuit of FIG. 10 is used to generate the signals BD1-BD4 inclusive for the latches 142, 144, 146, and 148 of FIG. 9. As previously mentioned, the signal PD is generated by the leading edge of a document as it approaches the read station 32. This signal is inverted by an inverter 156 and is applied as one input of an OR gate 158, the other input of which is in the nature of a feedback signal derived from the signal BD4, as will subsequently be described in greater detail. When the signal PD from the leading edge sensor goes to a high level, the output from the inverter 156 goes low. This output is applied to a counter 160, which may be of type 7493, manufactured by Texas Instruments, Inc., Dallas, Tex., and causes operation of the counter to be initiated. A clock pulse CLK1 is also applied to the counter, and causes the counter to step to cause signals to be generated successively at outputs A, B, C, and D. It may be noted that in the illustrated embodiment, the output D is not used. A first circuit path from the output terminal A extends to a first NAND gate 162; a second circuit path from terminal A extends to a NAND gate 166; and a third path extends to an inverter 170, where the signal is inverted and applied to NAND gates 164 and 168. Similar interconnections may be noted in FIG. 10 from terminals B and C to inverters 172 and 174, and to the various NAND gates 162, 164, 166 and 168. The signals BD1-BD4 are taken from the NAND gates 162, 164, 166 and 168, respectively. The manner in which these signals are generated may readily be seen. For example, at step 1, the output terminal A goes high, while terminals B, C and D remain low. Since the B and C signals are inverted by the inverters 172 and 174, all three inputs to the NAND gate 162 will be high, causing the output BD1 to go from a high to a low level, which is used to activate the latch 142 of FIG. 9.

The next pulse CLK1 applied to the counter 160 produces the low-going signal BD2 to activate the latch 144. Similarly, the third pulse applied to the counter 160 produces the signal BD3, and the fourth pulse applied to the counter 160 produces the signal BD4. The signal BD4 is also used to reset the counter 160. It is applied to the inverter 178, inverted, ANDed with a clock signal by AND gate 180, and applied as one input to the OR gate 158, as previously described. The circuit which includes the inverter 178 and the AND gate 180 is employed to produce a small delay in the resetting of the counter 160, until the next clock signal arrives.

While the form of the invention shown and described herein is admirably adapted to fulfill the objects aforesaid, it is to be understood that other and further modifications of the disclosed method and apparatus within the scope of the following claims may be made without departing from the spirit of the invention.

What is claimed is:

1. A record medium having a background of a given sensible characteristic and having sensible indicia located thereon in a plurality of zones of substantially equal area; each zone representing a predetermined value and comprising a plurality of elements each selected from a group comprising a first element in the form of a bar having a first length, a different sensibility than said background and a given width; a second element in the form of a bar having a different length than said first element, a different sensibility than said background and having a width substantially the same as said given width; and a third element in the form of a space having a width substantially the same as said given width and having the sensible characteristic of said background.

2. The record medium of claim 1 in which each element of said group has a different trinary value.

3. The record medium of claim 1 in which the sensibility of said first and second elements is the same.

4. The record medium of claim 1 in which each zone represents a character.

5. The record medium of claim 4 in which the number of elements in each zone is four.

6. The record medium of claim 1 in which the first and second elements include magnetic material.

7. The record medium of claim 1 in which the first and second elements include fluorescent material.

8. The record medium of claim 1 in which the second element is half the length of the first element.

9. A bar code which can be sensed and decoded by a sensing and decoding device, comprising a plurality of code zones of substantially equal area on a substrate; each zone representing a predetermined value and comprising a plurality of elements each selected from a group comprising a first element in the form of a bar having a first length, a first sensibility and a given width; a second element in the form of a bar having a different length than said first element, having said first sensibility and having a width substantially the same as said given width; and a third element in the form of a space having a width substantially the same as said given width and having a sensible characteristic different from said first sensibility.

10. The bar code of claim 9 in which each element of said group has a different trinary value.

11. The bar code of claim 9 in which the sensibility of said third element is the same as that of the substrate.

12. The bar code of claim 9 in which each zone represents a character.

13. The bar code of claim 12 in which the number of elements in each zone is four.

14. The bar code of claim 9 in which the first and second elements include magnetic material.

15. The bar code of claim 9 in which the first and second elements include fluorescent material.

16. The bar code of claim 9 in which the second element is half the length of the first element.

17. A device for reading and decoding bar code, said bar code comprising three different types of bar code elements, said device comprising, in combination:

a plurality of sensing means for sequentially sensing each bar code element in a data-representing group;

logic circuit means coupled to said sensing means and including first and second gating means for producing a combined signal representing one of said three different types of bar code elements in response to sequential sensing of each code element by said plurality of sensing means;

a plurality of storage means, each one coupled to said first and second gating means for storage of said combined signals, and each having a plurality of outputs on which storage output signals representing said combined signals are produced;

sequential means for causing successive ones of said storage means sequentially to store combined signals representing sequentially sensed bar code elements; and decoding means coupled to said outputs of said plurality of storage means for producing decoded data from successive groups of storage output signals from said plurality of storage means.

18. The device of claim 17 in which the logic circuit means also includes a plurality of flip flops equal in number to said sensing means and coupled thereto, the outputs of said flip flops being coupled to said first and second gating means.

19. The device of claim 17 in which said storage means are latches.

20. The device of claim 17 in which each of said sensing means includes means for amplifying, filtering and detecting the peaks of signals generated by sensing of said bar code elements.

21. The device of claim 17 in which the decoding means comprises a plurality of programmable decoders coupled in parallel to said outputs of said plurality of storage means.

22. A device for reading and decoding bar code characters, each of which characters includes a plurality of elements selected from a group comprising a first element in the form of a bar having a first length, a first sensibility and a given width; a second element in the form of a bar having a different length than said first element, said first sensibility, and a width substantially the same as said given width; and a third element in the form of a space having a width substantially the same as said given width and having a sensible characteristic different than said first sensibility, comprising in combination:

means for imparting motion to a record member bearing bar code characters;

a plurality of sensing means for sensing said bar code elements from said record member as it is moved relative to said sensing means;

a plurality of temporary storage devices corresponding in number to said sensing means and coupled thereto for temporarily storing signals derived by said sensing means from sensing a bar code element;

a first gating means coupled to at least one of said temporary storage devices;

a second gating means coupled to the remainder of said temporary storage devices;

the combined signal from said first and second gating means representing one of said first, second and third code elements in each instance;

control means for producing a sequential control signal;

a plurality of further storage devices, each having two inputs coupled respectively to the outputs of said first and second gating means for receiving said combined signal from said first and second gating means, and being sequentially operable by said sequential control signal for the storage in successive devices of successive signals corresponding to the sensing of successive bar elements from the record member being sensed, the plurality of further storage devices corresponding in number to the plurality of elements in a character; and decoding means coupled to said plurality of further storage devices for determining the character represented by the storage condition of said plurality of further storage devices.

23. The device of claim 22 in which said temporary storage means are flip flops.

24. The device of claim 22 in which said first and second gating means are AND gates.

25. The device of claim 22 in which said further storage devices are latches.

26. The device of claim 22 in which each of said sensing means includes means for amplifying, filtering and detecting the peaks of signals generated by sensing of said bar code elements.

27. The device of claim 22 in which each bar code character comprises four bar code elements.

28. The device of claim 22 in which the decoding means comprises a plurality of programmable decoders coupled in parallel to said plurality of further storage devices.

* * * * *